United States Patent
Woytowitz

(10) Patent No.: US 6,721,630 B1
(45) Date of Patent: Apr. 13, 2004

(54) EXPANDABLE IRRIGATION CONTROLLER WITH OPTIONAL HIGH-DENSITY STATION MODULE

(75) Inventor: Peter J. Woytowitz, San Diego, CA (US)

(73) Assignee: Hunter Industries, Inc., San Marcos, CA (US)

(*) Notice: Subject to any disclaimer, the term of this patent is extended or adjusted under 35 U.S.C. 154(b) by 0 days.

(21) Appl. No.: 10/455,994

(22) Filed: Jun. 5, 2003

(51) Int. Cl.[7] .............................................. G05D 11/00
(52) U.S. Cl. ......................................... 700/284; 239/69
(58) Field of Search ................................ 700/284, 283; 239/69; 137/624.11

(56) References Cited

U.S. PATENT DOCUMENTS

| | | | |
|---|---|---|---|
| 5,262,936 A | 11/1993 | Faris et al. ................... 364/140 |
| 5,278,749 A | * 1/1994 | De Man ........................ 239/69 |
| 5,444,611 A | * 8/1995 | Woytowitz et al. ........... 700/284 |
| 5,479,338 A | * 12/1995 | Erickson et al. ............. 700/284 |
| 5,839,658 A | 11/1998 | Sarver ............................ 239/1 |
| 5,921,280 A | 7/1999 | Ericksen et al. .......... 137/624.11 |
| 5,956,248 A | * 9/1999 | Williams et al. ............. 700/284 |
| 6,459,959 B1 | 10/2002 | Williams et al. ............. 700/284 |

* cited by examiner

Primary Examiner—Albert W. Paladini
(74) Attorney, Agent, or Firm—Michael H. Jester

(57) ABSTRACT

A modular expandable irrigation controller has a predetermined number of receptacles for removably receiving a maximum number of station modules. Each station module includes a station module circuit including at least one switching device for energizing a corresponding solenoid actuated valve. A processor executes a stored watering program to control the available station module circuits in accordance therewith. At least one standard station module is removably received in a single one of the receptacles. At least one enhanced station module is removably received in, and spans a, predetermined plurality of the remaining receptacles. The station module circuit of the enhanced station module includes more switching devices than the total number of switching devices included in the station module circuits of the total number of standard station modules that could otherwise be removably received in the predetermined plurality of receptacles spanned by the enhanced module.

22 Claims, 7 Drawing Sheets

EXPANDABLE IRRIGATION CONTROLLER WITH OPTIONAL HIGH-DENSITY STATION MODULE

CROSS-REFERENCE TO RELATED APPLICATION

This application is related in terms of overall subject matter to co-pending U.S. patent application Ser. No. 10/430,929, filed May 8, 2003 of Matthew G. Beutler et al. entitled "Positive Station Module Locking Mechanism for Expandable Irrigation Controller", the entire disclosure of which is hereby incorporated by reference. However, this application does not claim the benefit of the filing date of the aforementioned co-pending application under 35 U.S.C. Sec. 120 and therefore the term of any patent granted on this application shall not be measured from the filing date of the aforementioned co-pending application.

FIELD OF THE INVENTION

The present invention relates to electronic irrigation controllers that control valves which supply water to sprinklers, and more particularly, to modular expandable irrigation controllers.

BACKGROUND OF THE INVENTION

In many parts of the world due to inadequate rainfall it is necessary at certain times during the year to artificially water turf and landscaping. An ideal irrigation system for turf and landscaping should utilize a minimum number of valves, supply lines and sprinklers. Preferably the valves should be turned ON and OFF by an inexpensive, yet reliable electronic irrigation controller that is easy to program and can carry out a wide variety of watering schedules. The goal is to uniformly distribute the optimum amount of water over a given area. Rotor type sprinklers have largely displaced older impact type sprinklers in applications where large expanses of grass are watered, such as golf courses, due to the fact that the former are more reliable, quieter, and distribute water on a uniform and controlled basis. Spray type sprinklers, rotary stream sprinklers, bubblers and drip irrigation devices are also frequently used in residential and commercial irrigation systems. The type, placement and precipitation rates for each of the sprinklers are pre-selected when an irrigation system is designed and/or installed. The optimum precipitation rate provided by each sprinkler should preferably fall within plus or minus one-quarter gallon-per minute (GPM). The amount of water supplied by each sprinkler is largely determined by the size and configuration of its nozzle orifice(s), although variations result from fluctuations in water pressure that cannot be fully negated with regulators.

Preferably an irrigation controller should have the capability of temporarily terminating its watering program if sufficient rain occurs based on signals inputted from a rain sensor. See for example, U.S. Pat. No. 5,097,861 granted Mar. 24, 1992 of Hopkins et al. entitled IRRIGATION METHOD AND CONTROL SYSTEM, assigned to Hunter Industries, Inc., the assignee of the subject application, the entire disclosure of which is hereby incorporated by reference. On suitable rain sensor for this purpose is disclosed in pending U.S. patent application Ser. No. 10/053,100 filed Oct. 26, 2001 of Paul A. Klinefelter et al. entitled QUICK SHUT-OFF EXTENDED RANGE HYGROSCOPIC RAIN SENSOR FOR IRRIGATION SYSTEMS, also assigned to Hunter Industries, Inc., the entire disclosure of which is hereby incorporated by reference.

Residential and commercial irrigation systems typically include one or more solenoid operated valves that are turned ON and OFF by an electronic irrigation controller. The valves admit water to various subterranean branch lines usually made of PVC pipe that typically have several sprinklers connected to risers coupled to the branch lines at spaced intervals. Each combination of a solenoid valve and its associated sprinklers is referred to in the irrigation industry as a station or zone. A modern electronic irrigation controller typically includes a microprocessor and separate memory, or a micro-computer with on-chip memory, that stores and executes one or more watering programs. The watering programs can be pre-programmed by the user via push button and/or rotary controls. The controller usually has an LCD or other display to facilitate programming by the user. Often the controller will revert to a default watering program in the case of a power failure. The microprocessor controls the solenoid valves via suitable drivers and switching devices. The valves are opened and closed by the microprocessor in accordance with the pre-programmed run and cycle times for each of the stations.

Over the past decade, modular expandable irrigation controllers have gained increasing popularity. In these controllers, the base portion of the system contains the microprocessor and user actuated controls. Each station is then controlled by a corresponding station module which comprises a plastic housing that encloses and supports a station module circuit, as well as wire connection terminals for connecting wires to a plurality of solenoid actuated valves. Typically each station module can independently control more than one solenoid actuated valve, i.e., station. The station modules contain pins, sockets, card edge connectors or some other standard form of electro-mechanical connectors for allowing them to be inserted into slots or receptacles in either the housing that contains the microprocessor or a separate back panel hinged to the microprocessor housing. The advantage of this configuration is that the controller need only be equipped with the minimum number of station modules that can control the total number of stations needed. Thus, for example, an irrigation system may have only three zones, requiring only a single station module, while another may have twelve stations which might require four station modules. Considerable cost savings are thus achieved. Moreover, if an irrigation system expands after initial installation because the landscaping has increased, additional station modules can be plugged into the controller. In some modular expandable irrigation systems the base unit is capable of controlling a minimal number of stations without requiring the addition of any station modules. In others, such as the ICC™ irrigation controller manufactured and sold by Hunter Industries, Inc., at least a power module and one irrigation station module must be plugged into the controller in order to operate any stations or zones.

When the station modules are plugged into a modular expandable irrigation controller they are mechanically supported and an electrical connection is made between the microprocessor and the driver. The station modules can be removed and replaced if damaged, for example, during a lightening strike. U.S. Pat. No. 5,262,936 of Faris et al. discloses a modular irrigation controller having station expansion modules which are connected exterior of a base unit. These station expansion modules take up considerable space and their daisy chain connection scheme can unduly stress their electrical connectors. U.S. Pat. No. 6,459,959 of Williams et al. discloses a modular irrigation controller in which all of the station modules are received within corresponding slots or receptacles formed in the same housing that contains all of the manual controls and the processor that executes the watering program. The controller housing can only accept a predetermined maximum number of station modules. Each station module is identical and controls the same number of stations, and thus the number of stations that can be controlled is limited to the maximum number of station modules that can be inserted into the controller housing times the number of stations per module.

SUMMARY OF THE INVENTION

It is therefore the primary object of the present invention to provide a way to increase the station capacity of a modular expandable irrigation controller with a fixed number of module receptacles.

In accordance with the present invention a modular expandable irrigation controller is equipped with mechanisms for entry or selection of a watering program and for storing the watering program. The controller has a predetermined number of receptacles for removably receiving a maximum number of station modules. Each station module includes a station module circuit including at least one switching device for energizing a corresponding solenoid actuated valve in accordance with the watering program. A processor executes the stored watering program to control the station module circuits in accordance therewith. At least one standard station module is removably received in a single one of the receptacles. At least one enhanced station module is removably received in, and spans, a predetermined plurality of the remaining receptacles. The station module circuit of the enhanced station module includes more switching devices than the total number of switching devices included in the station module circuits of the total number of standard station modules that could otherwise be removably received in the predetermined plurality of receptacles spanned by the enhanced module.

The present invention also provides a method of increasing the number of stations in a modular irrigation controller. The first step of the method involves providing a microprocessor based irrigation controller with a plurality of receptacles for receiving a maximum number of station modules each having a station module circuit with at least one switching device that is controlled by the microprocessor to open and close a corresponding solenoid actuated valve operatively connected to the station module circuit. The second step of the method involves inserting a standard module into one of the receptacles, the standard station module including a station module circuit having a first predetermine number of switching devices. The third step of the method involves inserting an enhanced station module that spans a predetermined plurality of the remaining receptacles. The station module circuit of the enhanced station module includes a second predetermined number of switching devices that is larger than the product of the first predetermined number of switching devices times the plurality of receptacles spanned by the enhanced station module.

DESCRIPTION OF THE PREFERRED EMBODIMENTS

Figure 1:
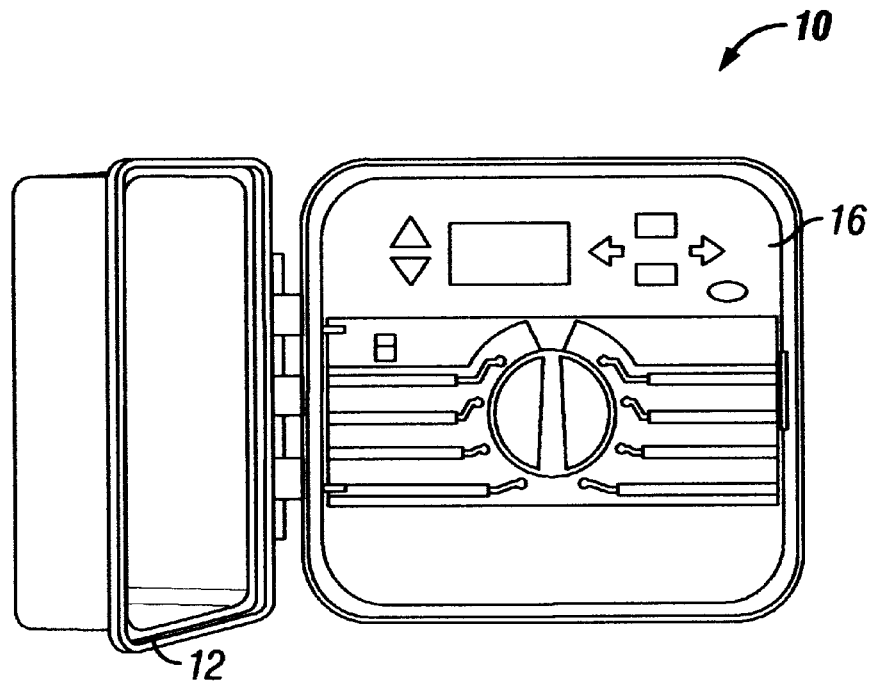
FIG. 1 illustrates a preferred embodiment of the present invention with its front door open to reveal its removable face plate.
Figure 2:
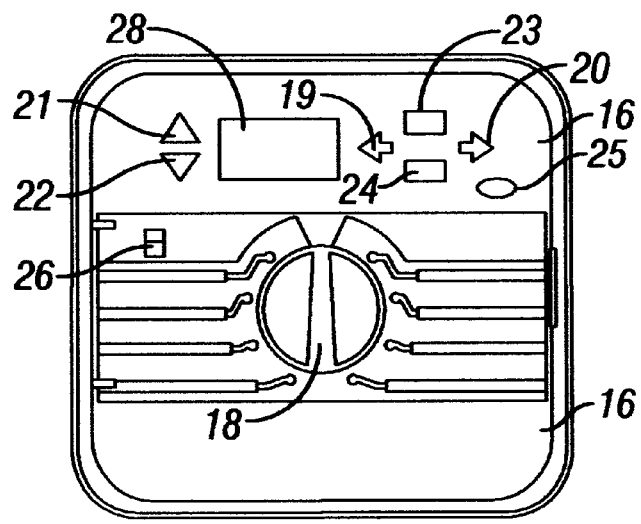
FIG. 2 is an enlarged plan view of the removable face plate.
Figure 3:
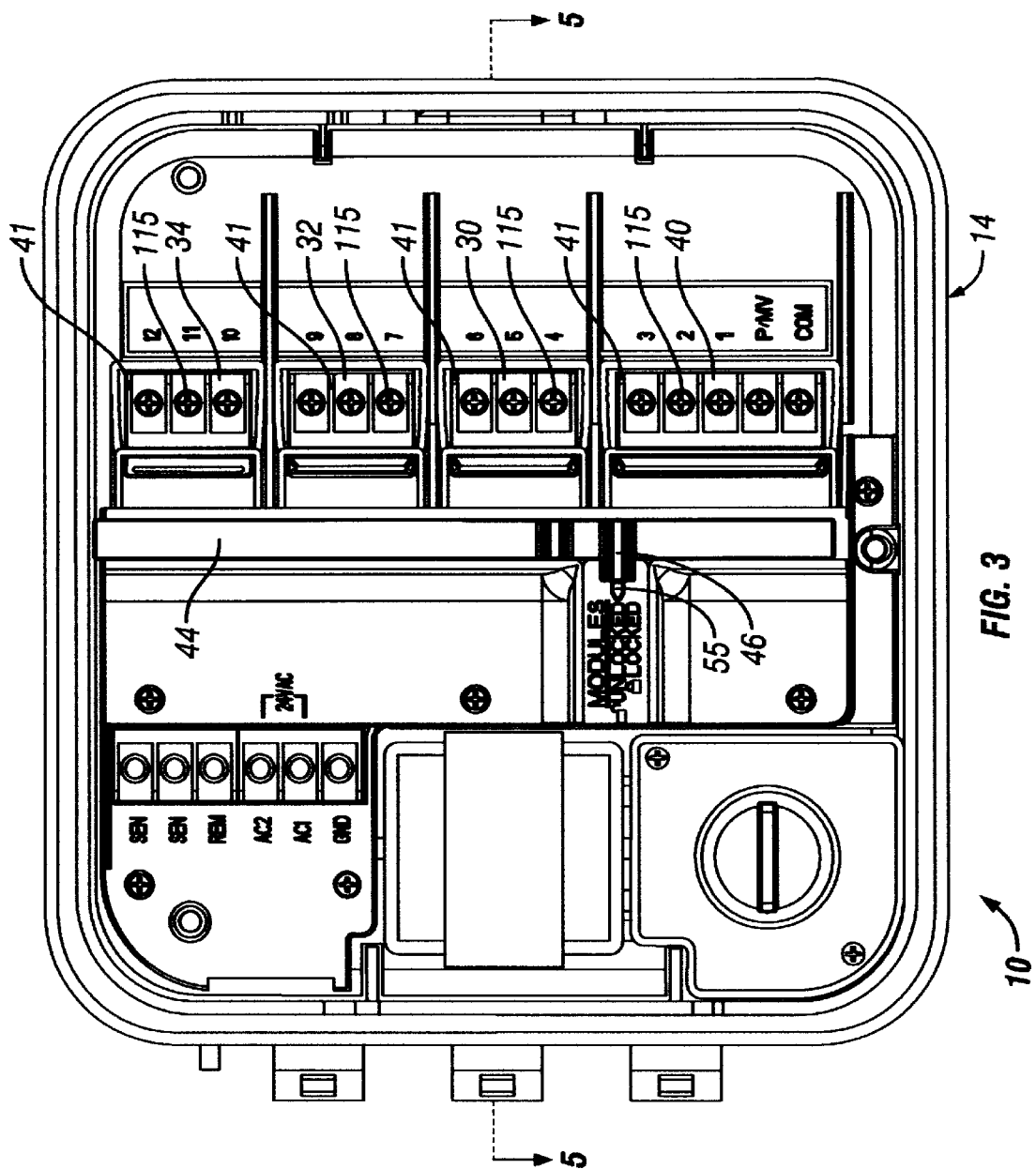
FIG. 3 is a still further enlarged plan view of the components of the preferred embodiment that are mounted in its back panel, which are accessible after the face plate has been removed. In this view a base module and three standard station modules are mounted in the receptacles of the back panel.

Referring to FIGS. 1 and 2, a modular expandable irrigation controller 10 in accordance with a preferred embodiment of my invention comprises a wall-mounted structure including a generally box-shaped front door 12 hinged along its right vertical edge to a generally box-shaped back panel 14 (FIG. 3). A removable rectangular face plate 16 (FIG. 2) is mounted over the back panel 14 and is normally concealed by the front door 12 when not being accessed for programming. The face plate 16 has a plurality of manually actuable controls including rotary dial switch 18 and push button switches 19, 20, 21 22, 23, 24 and 25 as well as slide switch 26, which can be manipulated in conjunction with numbers, words or other symbols indicated on a liquid crystal display 28 for entering or altering a watering program as is well known in the art of electronic irrigation controllers. As hereafter explained, the face plate 16 supports a PC board with a microprocessor for executing and implementing a stored watering program, and electrical connection is made between the face plate and the components in the back panel 14 via ribbon cable (not illustrated). The circuitry inside the face plate 16 can be powered by a battery to allow a person to remove the face plate 16, unplug the ribbon cable, and walk around the lawn, garden area or golf course while entering a watering program or altering a pre-existing watering program.

Figure 5:
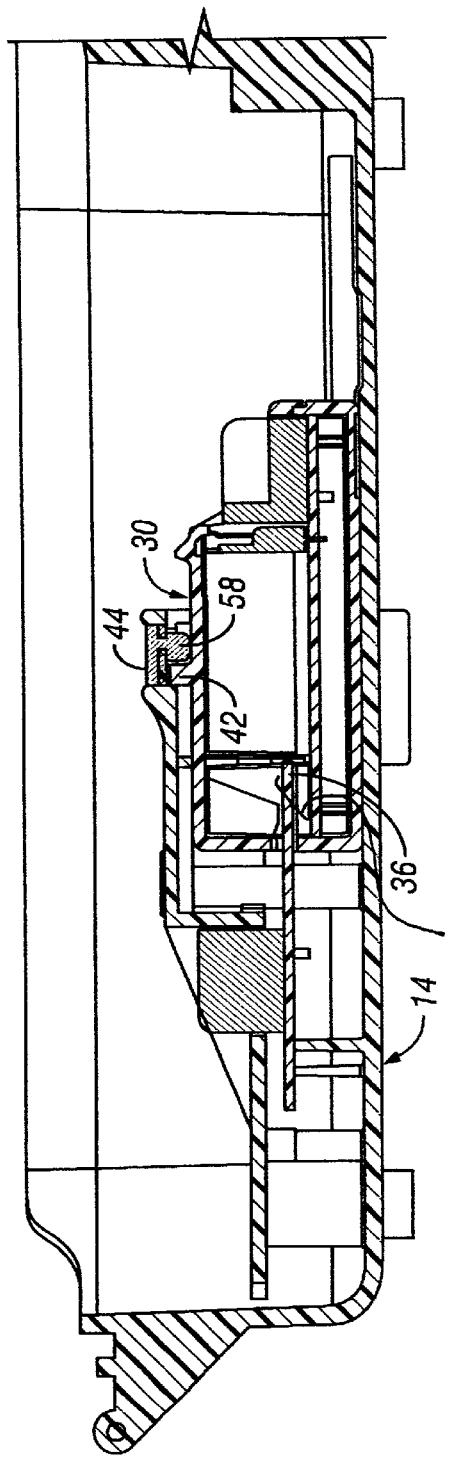
FIG. 5 is a vertical sectional view taken along line 5—5 of FIG. 3.
Figure 6:
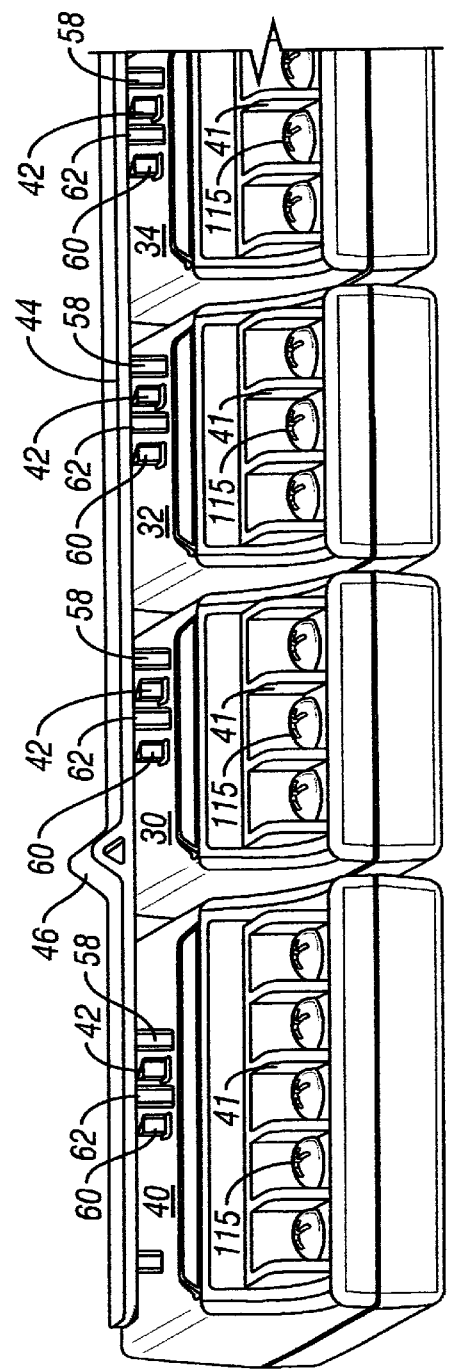
FIG. 6 is an enlarged fragmentary perspective view illustrating the relationship of the locking slide bar of the preferred embodiment to the four modules installed side-by-side in its bay when the locking slide bar is in its UNLOCKED position.
Figure 7:
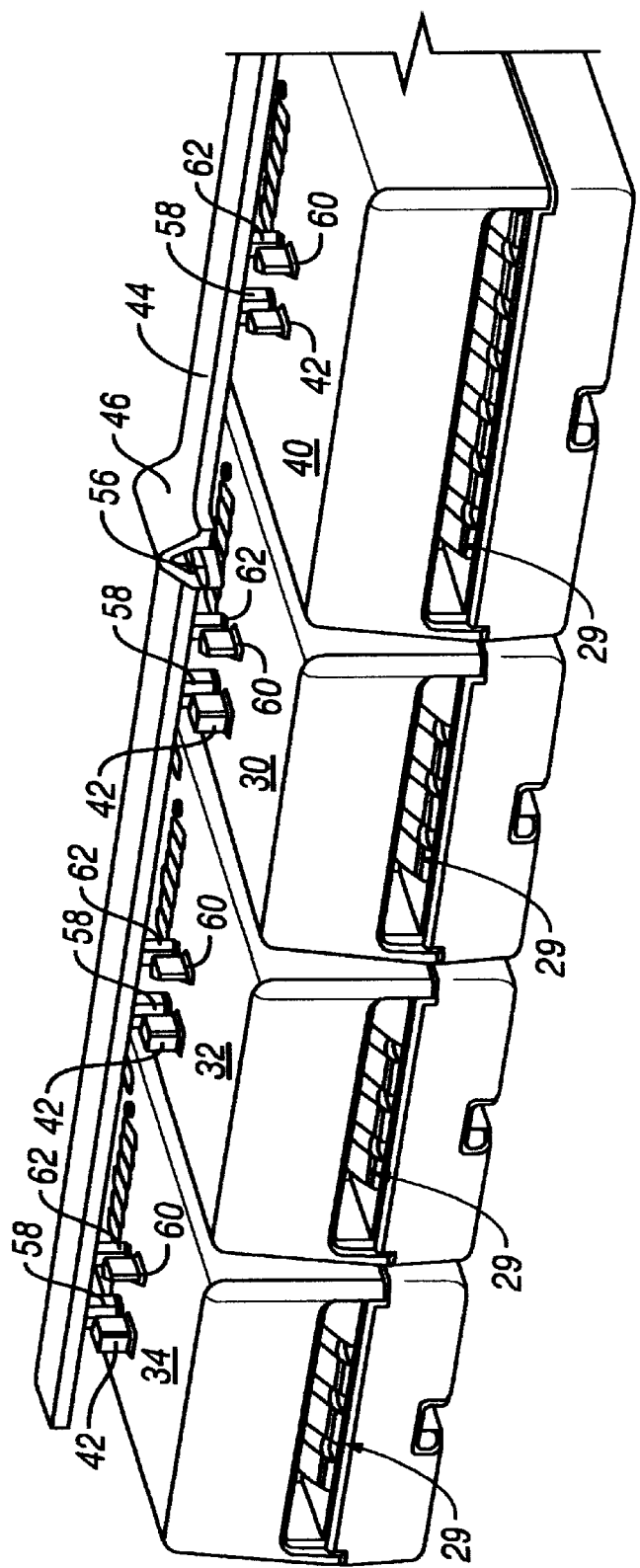
FIG. 7 is an enlarged fragmentary perspective view similar to FIG. 6 but taken from a different angle and illustrating the relationship of the locking slide bar of the preferred embodiment to the four modules installed side-by-side in its bay when the locking slide bar is in its LOCKED position.

Referring to FIG. 7, female electrical connectors 29 in the ends of three box-like standard station modules 30, 32 and 34 receive corresponding male card edge connectors such as 36 (FIG. 5) with mating electrical contacts. The standard station modules 30, 32 and 34 are received in side-by-side fashion in a bay formed in the back panel 14 (FIG. 3) which is separate from the face plate 16 that encloses the microprocessor. A larger, fourth box-like base module 40 (FIG. 6) plugs into the bay onto its own wider card edge connector and drives the pump master valve and the three standard station modules 30, 32 and 34. The base module has a female electrical connector 29' with more contacts that allows it to establish electrical connection to more contacts on its corresponding male edge card connector (not illustrated). The upper sides of the modules 30, 32, 34 and 40 each have an upstanding projection 42 (FIG. 6). A locking slide bar 44 (FIGS. 6 and 7)) with a V-shaped gripping member 46 extends above the bay and may be slid laterally (left and right) between an unlocked position illustrated in FIG. 6 and a locked position illustrated in FIG. 7. A pointed tab 55 (FIG. 3) extending from the gripping member 46 alternately points to UNLOCKED and LOCKED indicia molded into the adjacent back panel structure to indicate the module connection status to the user.

When the locking slide bar 44 is moved downwardly in FIG. 3 to its locked position, downwardly extending locking elements 58 (FIGS. 5 and 6) move behind the upstanding projection 42 on each of the modules 30, 32, 34 and 40 to mechanically lock the modules in the bay and prevent their withdrawal. Any or all of the modules can be removed from the bay by moving the locking slide bar 44 upwardly in FIG. 3 to its unlocked position so that the locking elements 58 are cleared from behind the projections 42 to permit the modules to be pulled off of their corresponding card edge connectors. The "new" modules 30, 32, 34 and 40 of the controller of FIGS. 4–9 are backward compatible with an earlier original design of the controller without the slide bar 44 because they simply plug into the card edge connectors which hold them in place. The "old" modules of the original controller are also forward compatible with the re-designed controller illustrated and described herein.

FIGS. 6 and 7 also illustrate the upstanding projection 60 of the old modules which is spaced laterally with respect to the upstanding projection 42 of the new modules. The locking slide bar 44 has alternate downwardly extending locking elements 62 (that are laterally displaced from the locking elements 58) and move behind the upstanding projections 60 of the old modules to lock them in place. The old modules only have the upstanding projection 60 and the new modules only have the upstanding projection 42, but both are shown in FIGS. 6 and 7 at the same time in order to illustrate the backward and forward compatibility.

Referring to FIG. 6, the upstanding projections 42 and 60 have a triangular cross-section the downwardly extending locking elements 58 and 62 have a rectangular cross-section. The projections 42 and 60 are oriented so that if a user tries to insert a module, such as 32, into a vacant receptacle in the bay formed in the back panel 14 when the slide bar 44 is in its locked position, the slide bar 44 will be forced to its unlocked position. This takes place as a result of the angled surfaces on the projections 42 and 60 colliding with and sliding the locking elements 58 and 62 laterally. This automatic unlocking feature prevents breakage of the projections 42 and 60 and/or the locking elements 48 and 62.

The positive module locking mechanism guards against partial or incomplete insertion of a module that could lead to shorts that would make the station or zone inoperable. The user is given visual and tactile feedback indicating that a positive lock has been established in the sense that each module has been fully inserted. The plurality of modules 30, 32, 34 and 40 are simultaneously locked and unlocked with respect to their respective receptacles.

The back panel 14 (FIG. 3) is typically installed on a vertical wall of a building structure so that the modules, such as 30 are plugged in and removed in a horizontal direction, lateral relative to the user. In other words, the back panel 14 is oriented so that the modules are in a vertical column with the standard station module 34 on top and the base module 40 on the bottom. This prevents the weight of the modules from tending to unplug the same as might occur if the back panel 14 were mounted by rotating it ninety degrees clockwise from the orientation illustrated in FIG. 3.

Figure 8:
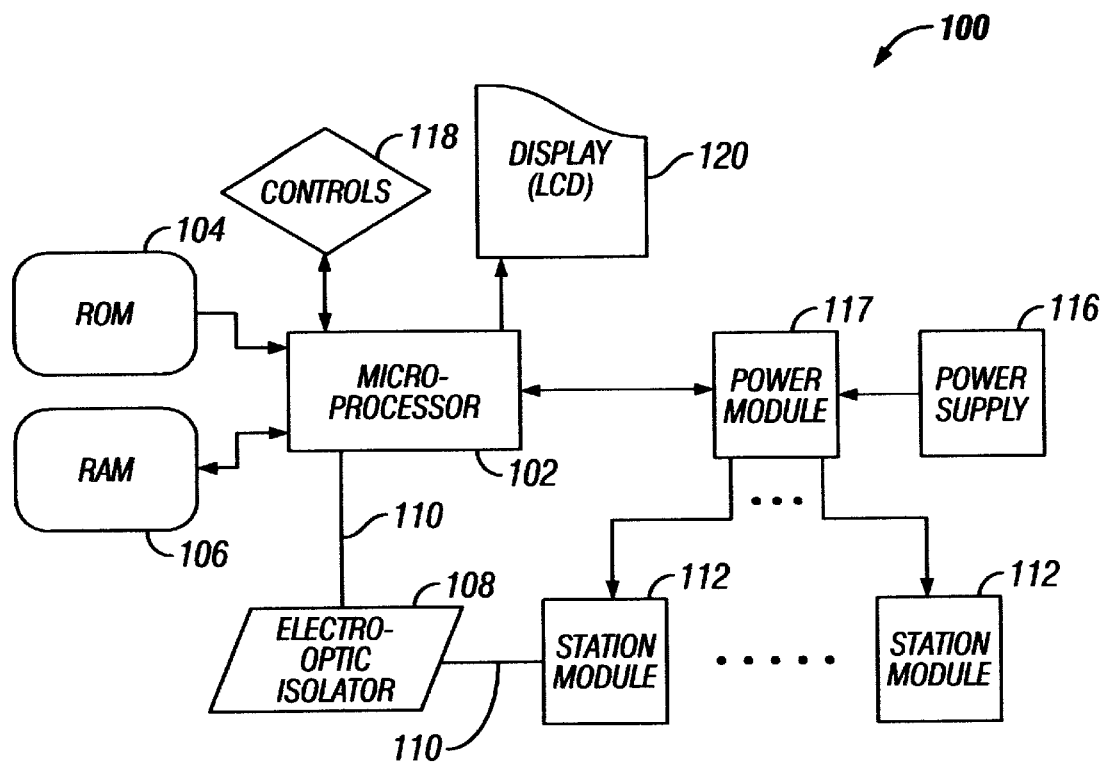
FIG. 8 is a block diagram of the overall irrigation controller circuit of the preferred embodiment.
Figure 9:
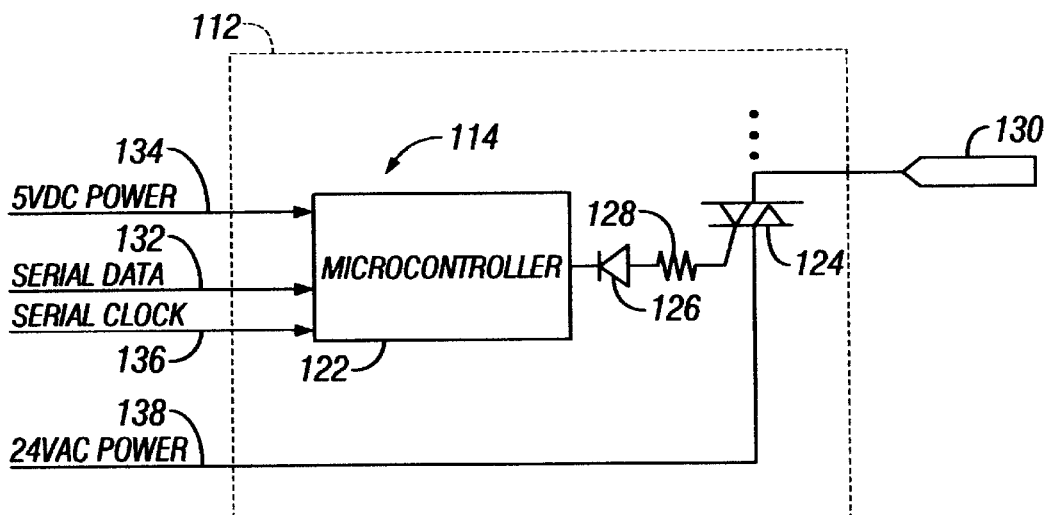
FIG. 9 is a schematic diagram of an exemplary circuit for one of the station modules of the irrigation controller circuit of FIG. 8.

FIG. 8 is a simplified block diagram of the electronic circuit 100 of the preferred embodiment 10 of my invention. Briefly, a microprocessor 102 mounted in the face plate 16 executes a selected watering program stored in ROM 104 using RAM 106. The microprocessor 102 is coupled through an optional electro-optic isolator 108 and a serial bus 110 to one or more removable station modules 112 each including a station module circuit 114 (FIG. 9) for energizing and de-energizing the solenoid of a corresponding valve (not illustrated) connected thereto via insulated wires (not illustrated). The electro-optic isolator 108 protects the microprocessor 102 from damage if lightening should destroy one or more of the station modules 112, but it may be eliminated for cost savings. The stripped inner ends of the wires that lead to the solenoid valves are secured to conventional screw terminals 115 (FIG. 6) of the modules 30, 32, 34 and 30. The screw terminals 115 are separated by upstanding divider walls 41 (FIG. 6) to prevent contact between adjacent wires. The valves may be of the type disclosed in U.S. Pat. No. 5,996,608 granted Dec. 7, 1999 of Richard E. Hunter et al. entitled DIAPHRAGM VALVE WITH FILTER SCREEN AND MOVABLE WIPER ELEMENT, Inc.; U.S. Pat. No. 6,079,437 granted Jun. 27, 2000 to Mathew G. Beutler et al. entitled DIAPHRAGM VALVE WITH FLOW CONTROL STEM AIR BLEED; and U.S. Pat. No. 5,979,482 granted Nov. 9, 1999 of Loren W. Scott entitled REMOVABLE CAPTIVE PLUNGER WITH CONTAMINATION PROTECTION, all assigned to Hunter Industries, Inc., the entire disclosures of which are hereby incorporated by reference.

The term "solenoid actuated valve" shall also encompass valves used in irrigation systems in which a pilot valve is not directly opened and closed by a solenoid. These include hydraulically or pneumatically actuated valves which have a solenoid or its electrical equivalent somewhere in the fluid system, and not necessarily next to the gating valve, for controlling the fluid pressure to open and close the valves.

A power supply 116 (FIG. 8) supplies the power needed to run the microprocessor 102 and energize the solenoids of the valves. A removable base or power module 117 contains current sensing resistors and has pump output terminals. Power is routed from the power supply 116 through the power module 117 to the microprocessor 102 and to the station modules 112. The DC power to run the microprocessor 102 and the logic circuitry inside the station modules 112 is supplied by the power supply 116 through the power module 117 to the microprocessor 102 and then back through the power module 117 to the station modules 112. The AC power for switching the solenoid actuated valves ON and OFF is supplied from the power supply 116 through the power module 117 to the station modules 112.

A set of manually actuated controls 118 such as those described in conjunction with FIG. 2, are connected to the microprocessor 102 for allowing a watering program to be entered, selected, altered, etc. with the aid of graphic and/or alphanumeric symbols shown on LCD 120. The controls may include a rotary switch, one or more pushbuttons, one or more slide switches, one or more membrane switches, one or more toggle switches, one or more insertable pins, a DIP switch, etc. Instead of using separate microprocessor 102, ROM 104 and RAM 106, a single micro-computer with on-chip memory may be utilized. The preferred configuration of my irrigation controller includes a main PC board (not illustrated) which supports the microprocessor 102, ROM 104, RAM 106, electro-optic isolator 108, serial bus 110 manual controls 118 and LCD 120. This main PC board is mounted inside the face plate 16 (FIG. 2) which is connected via ribbon cable (not illustrated) to the back panel 14 (FIG. 3). The back panel 14 provides an enclosure for the receptacles that removably receive the modules 30, 32, 34 and 40.

A port (not illustrated) may be connected to the microprocessor 102 for downloading a watering program that has been created on a personal computer and downloaded into a smart card, portable data shuttle or other removable media. See for example U.S. Pat. No. 6,088,621 granted Jul. 11, 2000 of Peter J. Woytowitz et al. entitled PORTABLE APPARATUS FOR RAPID RE-PROGRAMMING OF IRRIGATION CONTROLLERS, also assigned to Hunter Industries, Inc., the entire disclosure of which is hereby incorporated by reference. Alternatively, the microprocessor 102 could receive programming and/or commands from a master computer via hard-wired or wireless connection. The programming executed by the microprocessor 102 can include a cleaning cycle which momentarily turns on each valve after completion of a run cycle to flush debris away from the valve seat. See U.S. Pat. No. 5,829,678 granted Nov. 3, 1998 of Richard E. Hunter et al. entitled SELF-CLEANING LRRIGATION REGULATOR VALVE APPARATUS, also assigned to Hunter Industries, Inc., the entire disclosure of which is hereby incorporated by reference.

The microproces or 102 controls a plurality of solenoid actuated valves via the corresponding station module circuit 11 (FIG. 9) which is mounted on a small PC board contained within the plastic housing of each station module 112. The station module circuit 114 includes a microcontroller 122 that drives a switching device in the form of a triac 124 through a diode 126 and resistor 128. The triac 124 comprises two silicon controlled rectifiers (SCRS) connected in parallel and oppositely oriented to allow bi-directional control of a standard twenty-four volt AC signal sent to the solenoid of a valve via terminal 130. The control signal from the serial bus is applied to the microcontroller 122 via serial data lead 132 while a nominal DC voltage signal, such as five volts, is applied via another lead 134. Synchronous serial data is clocked into the microcontroller 122 from the microprocessor 102 via clock lead 136. Twenty-four volt AC power is supplied from the power module 116 to the triac 24 via lead 138. In the preferred embodiment of the station module circuit 114 triac 124, diode 126 and resistor 128 are duplicated three times so that one standard station module 112 can independently control up to three solenoid actuated valves (stations). The power module 117 also preferably has a similar station module circuit that allows it to control three solenoid actuated valves. Thus in its configuration illustrated in FIG. 3, the controller 10 can open and close up to twelve solenoid actuated valves via separate wires connected to screw terminals 115. Indicia marking these twelve different stations is molded into the adjacent wall of the back panel 14.

The power module 117 illustrated in block diagram form in FIG. 8 corresponds to the base module 40 illustrated in FIGS. 3, 4, 6 and 7. The valves that supply water to the sprinklers can thus be independently opened and closed by the microprocessor 102 utilizing the station module circuits 114 in accordance with the selected and/or pre-programmed run and cycle times for each of the stations. See also U.S. Pat. No. 5,444,611 granted Aug. 22, 1995 of Peter J. Woytowitz et al. entitled LAWN AND GARDEN IRRIGATION CONTROLLER, also assigned to Hunter Industries, Inc., the entire disclosure of which is hereby incorporated by reference.

The microprocessor 102 queries each of the station module circuits 114 to determine how many stations are available to control and which station or zone numbers they are associated with. Resistors (not illustrated) in the back plane of the main circuit board (not illustrated) inside the face plate 16 tell each of the microcontrollers 122 which slot each of the modules is plugged into. This information is supplied by each of the microcontrollers 122 to the microprocessor 102 in response to its queries. In this manner, the watering program executed by the microprocessor 102 will correctly control the run and cycle times in each station or zone since the wire from each solenoid actuated valve will be secured to one of the terminal screws 115 uniquely associated with each station or zone. Preferably the microprocessor 102 and the microcontrollers use an encryption algorithm that employs numerical keys buried at certain points in the data stream in order to ensure that only modules produced by the original manufacturer of the controller 10 will be compatible and will operate when plugged into the controller 10. This prevents customers and users from installing inferior expansion modules manufactured by third parties that either do not operate correctly and/or prematurely fail due to the use of inferior components and/or inferior manufacturing standards.

Figure 10:
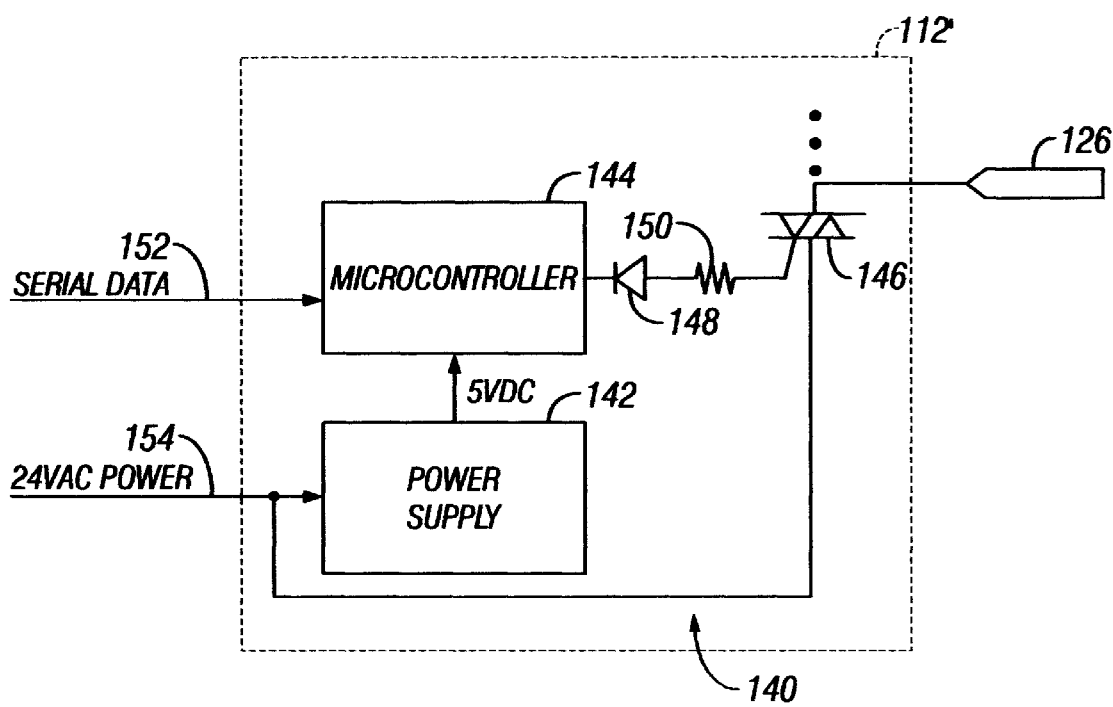
FIG. 10 is a schematic diagram of an alternate circuit for one of the station modules.

FIG. 10 is a schematic diagram of an alternate circuit 140 for one of the station modules 112'. Each station module 112' has its own power supply 142 that supplies a five volt DC signal to a microcontroller 144 that can switch a triac 146 through diode 148 and resistor 150. The station modules 112' each have three sets of the triac 146, diode 148 and resistor 150 (not illustrated) for independently actuating three stations. The alternate station module circuit 140 (FIG. 12) receives asynchronous serial data on serial data line 152. In other words, the microcontroller 144 of the station module 112' derives its clock signal from the serial data signal. Twenty-four volt AC power is supplied to each power supply 142 inside each station module 112' via lead 154. The circuit 140 is the preferred embodiment of the station module circuit.

Figure 4:
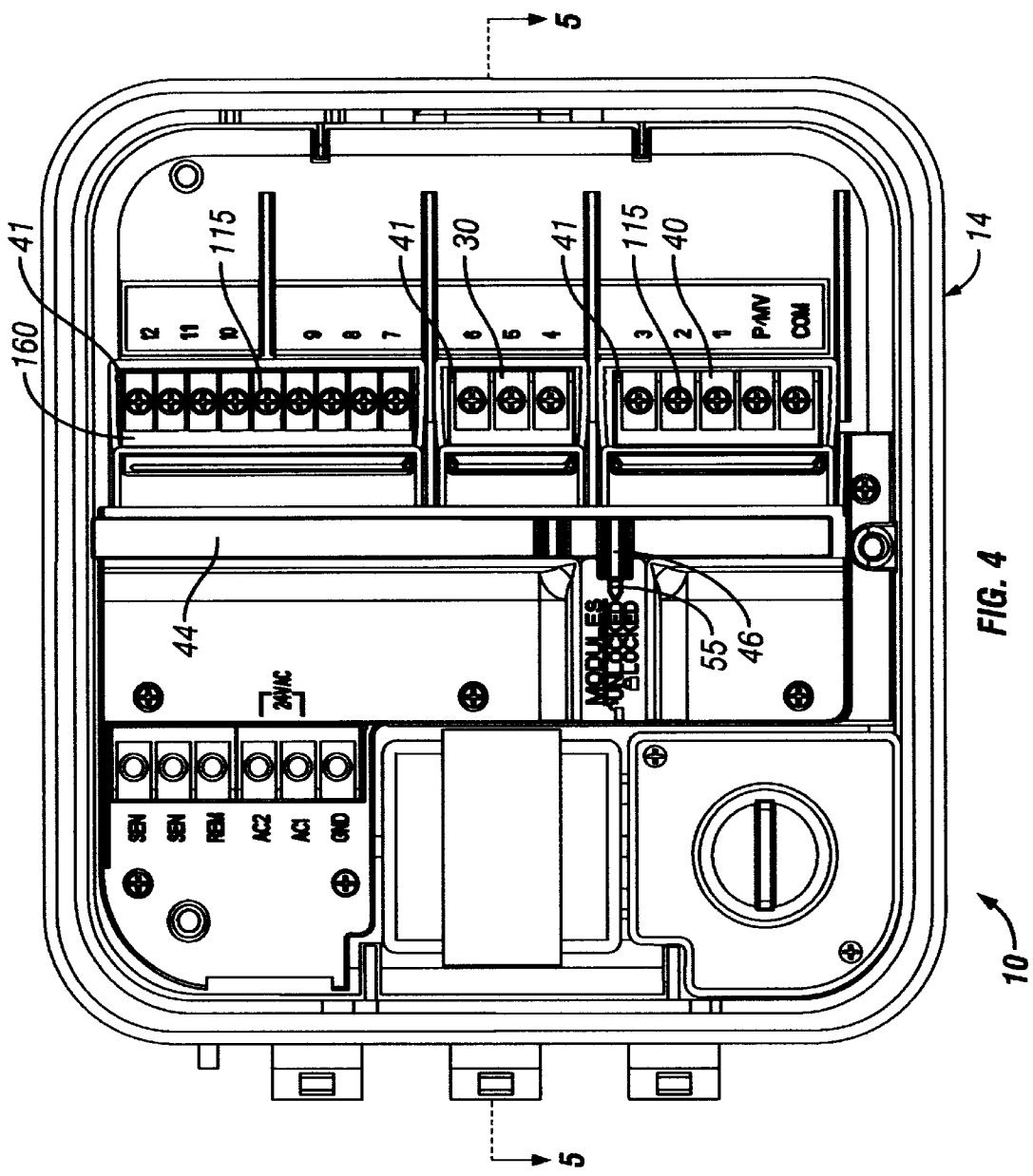
FIG. 4 is a view similar to FIG. 3 except that a base module, one standard station module and an enhanced station module are mounted in the receptacles of the back panel.

Referring to FIG. 4, my irrigation controller can be provided with a box-like enhanced module 160 which is physically similar to, but roughly twice the size of, each of the standard station modules 30, 32 and 34. Whereas each of the standard station modules 30, 32 and 34 occupies a single receptacle in the back panel 14, the enhanced station module is removably received in, and spans, two receptacles. The enhanced station module has a female electrical connector (not illustrated) similar to the female electrical connector 29 of the standard station modules 30, 32 and 34 which allows it to make electrical connection with the card edge connectors 36 of two adjacent receptacles in the back panel 14. The enhanced station module 160 has a station module circuit similar to the station module circuits 114 and 140 of the standard station modules 30, 32 and 34 and base module 140 each of which has three switching devices in the form of triacs 124 or 146, except that the former has a total of nine triacs. The enhanced station module 160 has nine screw terminals 115 for connecting these triacs to nine different solenoid actuated valves. Thus when the maximum number of modules is installed in the controller 10 in the form of base module 40 and standard station modules 30, 32 and 34, the controller 10 can control up to twelve solenoid actuated valves or stations. The screw terminal 115 of the base module 40 with the "P/MV" indicia molded next to the same is connected to a wire that carries the signal that is used to drive a pump master valve (not illustrated). The screw terminal 115 of the base module 40 with the "COM" indicia molded next to the same is connected to a common wire that is connected to each of the solenoid actuated valves.

When two of the standard station modules are removed, in this case station modules 32 and 34 (FIG. 3), and replaced with the enhanced station module 160 (FIG. 4), the controller 10 can control up to fifteen solenoid actuated valves or stations without physically adding any slots or receptacles in the back panel 14 and without attaching any expansion modules externally of the controller 10. Station number indicia from seven to fifteen are molded into the top surface of the module 160 next to corresponding ones of its nine screw terminals. The enhanced station module 160 thus provides an optional high-density station module that makes more efficient use of the available "real estate" within the module bay of the back panel 14 of the controller 10 by bridging several male card edge connectors 36.

Those skilled in the art will recognize that besides providing a new irrigation controller, I have also provided a novel method of expanding a modular irrigation controller. The present invention also provides a method of increasing the number of stations in a modular irrigation controller. The first step of the method involves providing a microprocessor based irrigation controller 10 with a plurality of receptacles for receiving a maximum number of modules 30, 32, 34, and 40 each having a station module circuit 114 or 140 with at least one switching device 124 or 146 that is controlled by the microprocessor 102 to open and close a corresponding solenoid actuated valve operatively connected to the station module circuit. The second step of the method involves inserting a standard module such as 30, 32 or 34 into one of the receptacles, the standard station module including a station module circuit 114 or 140 having a first predetermine number of switching devices 124 or 146, such as three. The third step of the method involves inserting an enhanced station module 160 that spans a predetermined plurality of the remaining receptacles, which in the preferred embodiment is two. The station module circuit 114 or 140 of the enhanced station module 160 includes a second predetermined number of switching devices 124 or 146, which in the preferred embodiment is nine, that is larger than the product of the first predetermined number of switching devices (three) times the plurality of receptacles (two) spanned by the enhanced station module 160, which equals six.

While I have described a preferred embodiment of my modular expandable irrigation controller and a method of expanding a modular irrigation controller, it will be apparent to those skilled in the art that my invention can be modified in both arrangement and detail. For example, the number of stations or zones controlled by the base module, standard station module and enhanced station module could be varied. Each station module 112 or 112' could be configured for controlling only a single station. The enhanced station module 160 could span more than two receptacles. An enhanced station module could also be configured to span less than the space required by a single standard station module, e.g. one-half of a receptacle, or could be configured to span some other fractional amount, such as one and one-half receptacles. In other words, one enhanced station module could span a predetermined fractional portion of the predetermined width of all of the receptacles and the station module circuit of the enhanced station module could include more switching devices than the total number of switching devices included in the station module circuit of the standard station module. The controller 10 could be configured so that no base module or power module is required, i.e. the circuitry contained in these modules could be incorporated into the circuitry contained in base portion of the controller 10, which in the illustrated embodiment comprises the face plate 16. The controller 10 could therefore be modified to accept and control two enhanced station modules 160. The station module circuit could take many different forms and could use switching devices besides triacs 124 and 146 such as bipolar transistors, field effect transistors, relays, and equivalents. Therefore, the protection afforded my invention should only be limited in accordance with the following claims.

I claim:

1. A modular expandable irrigation controller, comprising:

means for entry or selection of a watering program;

means for storing the watering program;

a backpanel that provides a predetermined number of receptacles for removably receiving a maximum number of station modules, each station module including a station module circuit including at least one switching device for energizing a corresponding solenoid actuated valve in accordance with the watering program;

processor means for executing the stored watering program to control the station module circuit of each of the station modules in accordance therewith;

at least one standard station module removably received in a single one of the receptacles; and at least one enhanced station module removably received in, and spanning, a predetermined plurality of the remaining receptacles, the station module circuit of the enhanced station module including more switching devices than the total number of switching devices included in the station module circuits of the total number of standard station modules that could otherwise be removably received in the predetermined plurality of receptacles spanned by the enhanced module.

2. The controller of claim 1 wherein the processor means includes means for querying each of the station modules to determine a total number of available station module circuits before controlling the station module circuits.

3. The controller of claim 1 wherein each of the modules includes a female electrical connector.

4. The controller of claim 1 wherein each of the receptacles includes a card edge connector.

5. The controller of claim 1 wherein the station module circuit includes a microcontroller.

6. The controller of claim 1 wherein each of the modules has a plurality of screw terminals.

7. The controller of claim 1 wherein the controller further comprises a back panel in which the receptacles are located.

8. The controller of claim 7 wherein the controller further comprises a face plate removably mounted over the back panel and supporting a circuit board on which the processor means is mounted.

9. The controller of claim 8 wherein the controller further comprises a door hingedly connected to the back panel for enclosing the face plate.

10. The controller of claim 1 and further comprising a base module removably received in one of the receptacles and including circuitry for supplying a drive signal to the switching device of each of the station module circuits.

11. A modular expandable irrigation controller, comprising:

a back panel that provides a predetermined number of receptacles for removably receiving a maximum number of station modules, each station module including a station module circuit including at least one switching device for energizing a corresponding solenoid actuated valve;

a face plate that can be mounted over the back panel and including a circuit board for supporting a plurality of push buttons for entry or selection of a watering program and a display for indicating numbers, words or symbols associated with the watering program;

a memory mounted on the circuit board for storing the watering program;

a microprocessor mounted on the circuit board for executing the stored watering program to control the station module circuit of each of the station modules in accordance therewith;

means for providing an electrical connection between the circuit board and the receptacles;

at least one standard station module removably received in a single one of the receptacles; and at least one enhanced station module removably received in, and spanning, a predetermined plurality of the remaining receptacles, the station module circuit of the enhanced station module including more switching devices than the total number of switching devices included in the station module circuits of the total number of standard station modules that could otherwise be removably received in the predetermined plurality of receptacles spanned by the enhanced module.

12. The controller of claim 11 wherein the microprocessor includes means for querying each of the station modules to determine a total number of available station module circuits before controlling the station module circuits.

13. The controller of claim 11 wherein each of the modules includes a female electrical connector.

14. The controller of claim 11 wherein each of the receptacles includes a card edge connector.

15. The controller of claim 11 wherein the station module circuit includes a microcontroller.

16. The controller of claim 11 wherein each of the modules has a plurality of screw terminals.

17. The controller of claim 11 wherein the means for providing an electrical connection between the circuit board and the receptacles comprises a ribbon cable.

18. The controller of claim 11 wherein the controller further comprises a door hingedly connected to the back panel for enclosing the face plate.

19. The controller of claim 11 and further comprising a base module removably received in one of the receptacles and including circuitry for supplying a drive signal to the switching device of each of the station module circuits.

20. A method of increasing the number of stations in a modular irrigation controller, comprising the steps of:

providing a microprocessor based irrigation controller with a plurality of receptacles for receiving a maximum number of station modules each having a station module circuit including at least one switching device that is controlled by the microprocessor to open and close a corresponding solenoid actuated valve operatively connected to the station module circuit;

inserting a standard module into one of the receptacles, the standard station module including a station module circuit having a first predetermined number of switching devices; and inserting an enhanced station module that spans a predetermined plurality of the remaining receptacles, the station module circuit of the enhanced station module including a second predetermined number of switching devices that is larger than the product of the first predetermined number of switching devices times the plurality of receptacles spanned by the enhanced station module.

21. A modular expandable irrigation controller, comprising:

means for entry or selection of a watering program;

means for storing the watering program;

a backpanel that provides a predetermined number of receptacles for removably receiving a maximum number of station modules, each station module including a station module circuit including at least one switching device for energizing a corresponding solenoid actuated valve in accordance with the watering program;

processor means for executing the stored watering program to control the station module circuit of each of the station modules in accordance therewith; and the receptacle means being capable of removably receiving, and the processor means being capable of controlling, at least one standard station module in a single one of the receptacles and at least one enhanced station module that spans a predetermined plurality of the receptacles, the station module circuit of the enhanced station module including more switching devices than the total number of switching devices included in the station module circuits of the total number of standard station modules that could otherwise be removably received in the predetermined plurality of receptacles spanned by the enhanced module.

22. A modular expandable irrigation controller, comprising:

means for entry or selection of a watering program;

means for storing the watering program;

a backpanel that provides a predetermined number of receptacles for removably receiving a maximum number of station modules, each station module including a station module circuit including at least one switching device for energizing a corresponding solenoid actuated valve in accordance with the watering program;

processor means for executing the stored watering program to control the station module circuit of each of the station modules in accordance therewith; and the receptacle means being capable of removably receiving, and the processor means being capable of controlling, at least one standard station module in a single one of the receptacles and at least one enhanced station module that spans a predetermined fractional portion of a predetermined width of all of the receptacles, the station module circuit of the enhanced station module including more switching devices than the total number of switching devices included in the station module circuit of the standard station module.

* * * * *